United States Patent [19]
Wright

[11] Patent Number: 5,208,501
[45] Date of Patent: May 4, 1993

[54] RIM DRIVEN STEPPER MOTOR AND METHOD OF OPERATION RIM DRIVEN

[75] Inventor: Tommy D. Wright, Irving, Tex.

[73] Assignee: Texas Instruments Incorporated, Dallas, Tex.

[21] Appl. No.: 727,328

[22] Filed: Jul. 3, 1991

Related U.S. Application Data

[63] Continuation of Ser. No. 563,238, Aug. 6, 1990, abandoned.

[51] Int. Cl.$^5$ .................. H02K 41/02; H02K 21/12; H02K 1/27
[52] U.S. Cl. ..................... 310/75 C; 310/12; 310/156; 310/267
[58] Field of Search .......... 310/12, 13, 14, 35, 310/36, 37, 75 C, 156, 255, 267, 265, 266; 318/115, 135, 687; 352/69; 359/443, 446, 458

[56] References Cited

U.S. PATENT DOCUMENTS

| | | | |
|---|---|---|---|
| 1,223,459 | 4/1917 | Whitney | 340/815.1 |
| 1,551,347 | 8/1925 | Trombetta | 318/161 |
| 1,794,103 | 2/1931 | Cubitt | 352/43 |
| 2,189,374 | 2/1940 | Surbeck | 38/24 |
| 2,589,569 | 3/1952 | Peter et al. | 340/815.07 |
| 3,202,985 | 8/1965 | Perkins et al. | 343/7.9 |
| 3,204,238 | 8/1965 | Skellett | 343/7.9 |
| 3,223,865 | 12/1965 | Gladstone | 310/103 |
| 3,265,911 | 1/1964 | Madsen | 310/12 |
| 3,471,641 | 10/1969 | Baker et al. | 358/199 |
| 3,509,390 | 4/1970 | Loughlin et al. | 310/15 |
| 3,549,800 | 12/1970 | Baker | 358/231 |
| 3,668,443 | 6/1972 | Schwartz | 310/12 |
| 3,682,553 | 8/1972 | Kapany | 356/4 |
| 3,736,449 | 5/1973 | Honeywell et al. | 310/171 |
| 3,757,106 | 9/1973 | Bau et al. | 362/231 |
| 3,825,335 | 7/1974 | Reynolds | 355/1 |
| 3,825,336 | 7/1974 | Reynolds | 355/1 |
| 3,845,995 | 11/1974 | Wehde | 308/10 |
| 3,851,196 | 11/1974 | Hinds | 310/12 |
| 3,909,643 | 9/1975 | Kishima | 310/68 |
| 3,915,416 | 10/1975 | Anderson | 244/165 |
| 3,970,361 | 7/1976 | Di Matteo et al. | 350/144 |
| 4,130,832 | 12/1978 | Sher | 358/89 |
| 4,297,009 | 10/1981 | Mezrich et al. | 352/86 |
| 4,382,216 | 5/1983 | Joseph | 318/630 |
| 4,497,582 | 2/1985 | Lipman et al. | 368/15 |
| 4,535,394 | 8/1985 | Dugre | 362/231 |
| 4,707,642 | 11/1987 | Sorimachi et al. | 318/37 |
| 4,786,832 | 11/1988 | Nakagawa et al. | 310/12 |
| 4,871,231 | 10/1989 | Garcia, Jr. | 350/144 |
| 4,897,582 | 1/1990 | Otten et al. | 318/135 |
| 4,908,558 | 3/1990 | Lordo et al. | 318/648 |
| 4,922,336 | 5/1990 | Morton | 358/88 |
| 4,943,851 | 7/1990 | Lang et al. | 358/87 |
| 5,023,496 | 6/1991 | Niikura | 310/12 |

FOREIGN PATENT DOCUMENTS

| | | | |
|---|---|---|---|
| 261932 | 5/1968 | Austria | 352/69 |
| 0002848 | 1/1987 | Japan | 310/12 |
| 0283051 | 11/1989 | Japan | 310/12 |

OTHER PUBLICATIONS

07/409,176 Garcia, Jr. Real Time Three Dimensional Display and Method.

*Primary Examiner*—Steven L. Stephan
*Assistant Examiner*—D. R. Haszko
*Attorney, Agent, or Firm*—Rene E. Grossman; Richard L. Donaldson

[57] ABSTRACT

There is disclosed a system and method for rotationally controlling a circular structure, such as a dome, from the outer circumference of the dome. The system uses a linear stepping motor having a circular fixed section and a movable section. The movable section is attached to the rim of the dome and is in magnetic coupled contact with the fixed section. Controllable magnetic fields induced between the movable and stationary sections cause the movable section, and hence the dome, to drive around the circular fixed section. The dome speed is controlled by the magnetic fields and the position of the dome is monitored by monitoring the position of the active magnetic fields.

17 Claims, 3 Drawing Sheets

RIM DRIVEN STEPPER MOTOR AND METHOD OF OPERATION RIM DRIVEN

This application is a continuation of application Ser. No. 07/563,238, filed Aug. 6, 1990, now abandoned.

TECHNICAL FIELD OF THE INVENTION

This invention relates to rotational object support and control and more particularly to a linear stepper motor system for precisely controlling the rotating surface by applying rotational force at its periphery.

RELATED APPLICATIONS

All of the following patent applications are cross-referenced to one another, and all have been assigned to Texas Instruments Incorporated. These applications have been concurrently filed and are hereby incorporated in this patent application by reference:

A System and Method for Support and Rotation of an Object, patent application Ser. No. 563,180; Linear Stepper Motor Design and Method of Operation, patent application Ser. No. 563,238; Apparatus and Method for Volume Graphics Display, patent application Ser. No. 563,372; Volume Display Development System, patent application Ser. No. 563,374; and Volume Display Optical System and Method, patent application Ser. No. 563,370.

BACKGROUND OF THE INVENTION

A relatively new display system has been developed which generates images in all three physical dimensions. The system relies on the generation within a confined space, typically, a closed dome, of a volume upon which coherent light impacts to create the images. Each image is comprised of a number of light pixels (called voxals) usually generated by one or more laser beams impacting on the generated volume within the dome.

The defined volume can be created by spinning a helix shaped surface (disk) within the dome so that as the disk spins a volume is created defined by the disk surface as it moves up and down in a helical curve. Thus, at any point in time a different height of the volume is at a given physical location within the dome. A light spot can then be created by impacting a beam of coherent light with the disk at a particular point in time coinciding with the height desired for that point of light. By timing a large number of such light beams, three dimensional objects can be created within the dome and these objects then can be viewed from any position since the spinning disk (which creates the display volume) is essentially transparent to system is the subject of U.S. patent application, Ser. No. 07/409,176.

There is presently an item on the market called a linear stepper motor. Its design and operation are well known to those skilled in the art. One of the advantages of linear stepper motors is their ability to move a motor or forcer precisely along a track or platen. Linear stepper motors also allow precise determination of the location of the forcer with respect to the platen. Linear stepper motors have the property that they are precisely controllable while also allowing for positional determination.

Available linear stepper motors, however, have at least one limitation. They are only able to direct the forcer along a straight platen. Linear stepper motors are presently incapable of operating in a circular path. Thus, a need exists in the art for a linear stepper motor that can drive a body in a circular motion.

SUMMARY OF THE INVENTION

Linear stepper motors which operate in a horizontal straight plane are very accurate. They can propel objects both forward and backward and move along a fixed platen under control of a forcer. Controlled magnetic attraction and repulsion between the forcer and the platen cause the forcer to move along the platen. We have made the platen movable in conjunction with the object to be rotated and made the previously movable forcer stationary. Then by bending the platen into a diameter and attaching it to a circular object, such as the rim of a dome, it can be made to travel clockwise and counterclockwise around a circle. The system is designed to know where a given point is on the platen at all times by means of magnetic and electrical feedback.

Accordingly, it is one technical advantage to create a linear motor which can operate to rotate turntables, propellers, screens, and other objects around a central axis while also maintaining an accurate account of where the objects are in space by monitoring the attached platen.

Thus, it is another technical advantage of this invention that a rotating disk is positioned within a defined structure, such as a dome, and mechanically attached to the circumference of the dome and then made to rotate in conjunction with the rotation of the dome, all under control of a linear stepper motor.

It is a further technical advantage of this invention to provide such a system where the rotation is controlled by a linear stepper motor operating in a circular fashion at the periphery of the disk.

BRIEF DESCRIPTION OF THE DRAWINGS

The foregoing objects, features and technical advantages, as well as others, of the invention will be more apparent from the following description of the drawings in which.

DETAILED DESCRIPTION OF THE INVENTION

Figure 9:
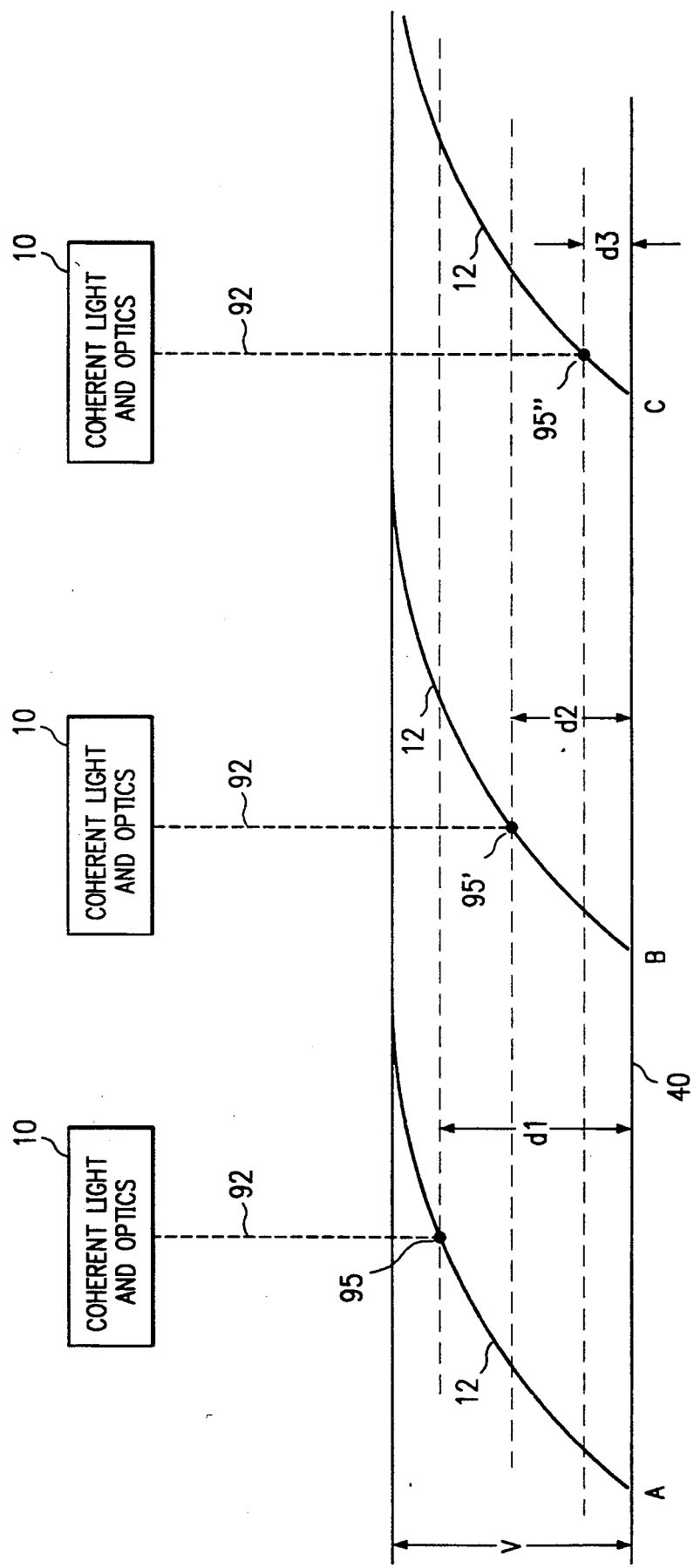
FIG. 9 shows an illustration of the volume created by a helix shaped surface.

Before beginning a discussion of the dome and linear stepper motor, a brief overview of the manner in which images are created in a defined volume is appropriate. Such a discussion is with respect to FIG. 9 where surface 12, which in one embodiment can be a single or double helix, defines a volume V as it rotates about some central point. Each point in time A, B and C shows the helix at the same physical (spatial) place but at a slightly different time. Since the helix is spinning at a rate of 600 rpm or faster, the human eye will treat the surface as being transparent. It is this transparency that allows for the creation of three-dimensional images when a coherent light source impacts the surface.

Thus, coherent light source and optics system 10, discussed in more detail in concurrently filed patent application entitled "Volume Display Optical System and Method" provides a pulse of light 102 which has been spatially positioned and timed such that it impacts with surface 12 to form a point of light 105 at a height d1 from a base line 40. This pulse could be timed to arrive a little later in time and then it would impact surface 19 to create point of light 105' which is displaced from base line 40 at a height of d2. Still further delay in the beam 102 would result in a point of light 105" at a height of d3 from base line 40.

Using this technique and understanding that light source 10 can deliver multiple light beams over a wide spatial range at each point in time, then three dimensional images can be formed from the points of light. Because the spinning helix is transparent to the human eye, the light spots will appear to be free floating and can be viewed from any angle and from any side.

Figure 1:
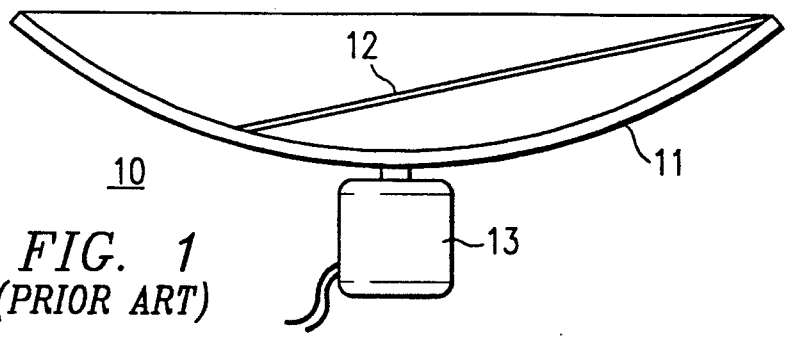
FIG. 1 shows an illustration of a surface creating a defined volume within a dome.

FIG. 1 shows a system 10 having disk 12 fused inside of inverted dome 11. Disk 12 is actually a flat circular disk that rotates to define the volume as discussed above. Motor 13 rotates the combined disk and dome.

Figure 2:
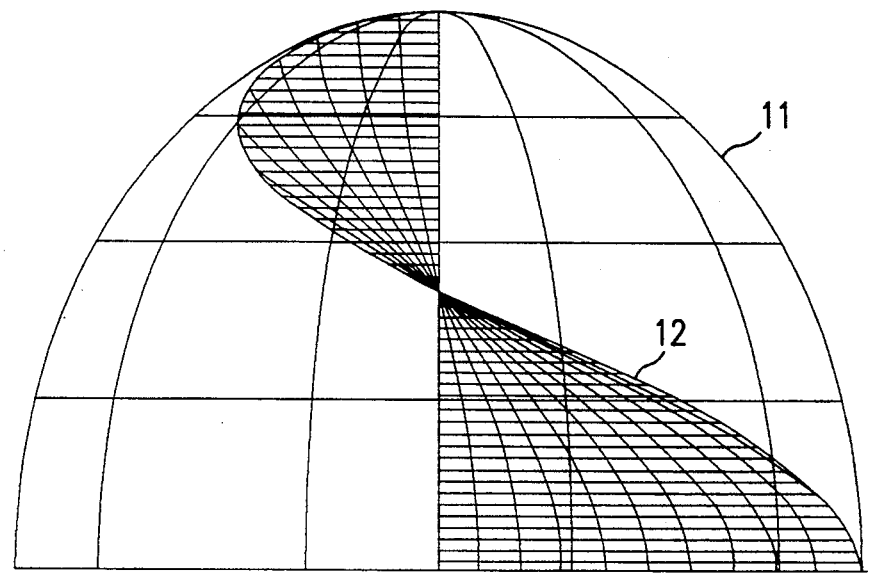
FIGS. 2-4 show graphically the volumes created by the rotating surface.

FIG. 2 shows dome 11 in actual contact with disk 12. Disk 12 illustrates the viewing area defined by the tangency of dome 11 and disk 12. Disk 12 is a helix in this embodiment.

Figure 3:
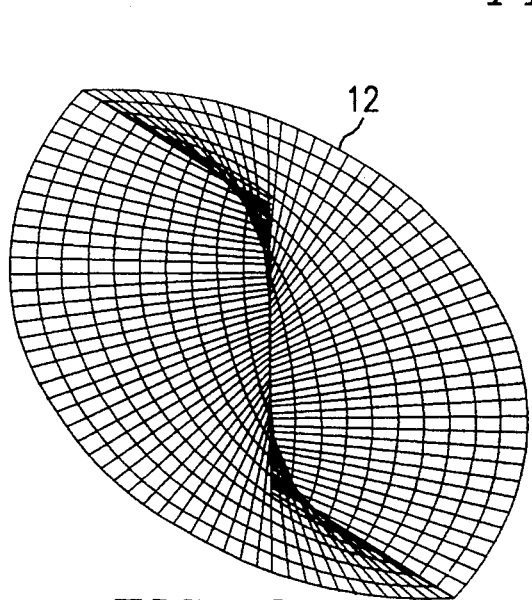

FIG. 3 shows a top view of disk 12. Disk 12 is a double helix in this embodiment.

Figure 4:
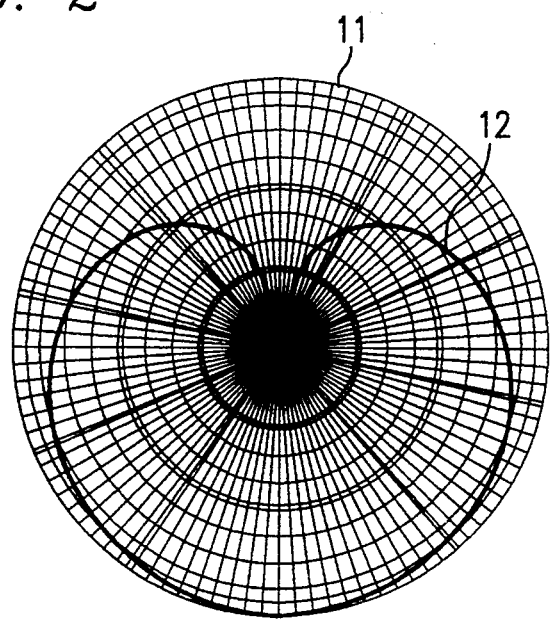

FIG. 4 is the geometric design of a two foot rise disk 12. Rise is the amount of volume in dome 11 that can display an image. This figure represents the vertical elevation of the disk at the highest point as a radial distance.

Figure 5:
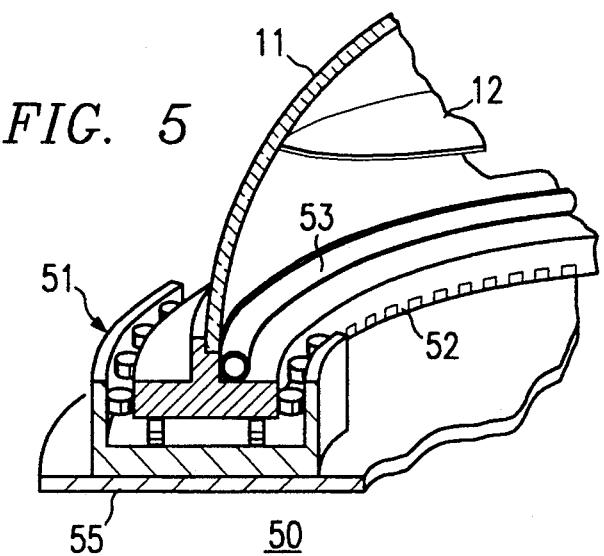
FIG. 5 shows the outer edge of a dome attached to the platen of the linear stepper motor.

FIG. 5 is a diagram of a linear drive stepper motor 50 having forcer 51 which is the drive mechanism. Platen 52 is a track that forcer 51 propels. Forcer 51 is stationary and platen 52 is propelled about a circle. Dome 11 is attached to platen 52. Surface 53 allows a balancing mechanism or static balance weights to be applied to dome 11 and disk 12 to stabilize the dome and disk during rotation.

A specific instance of such a linear stepper motor is a linear stepper motor for the rotation of a screen about an axis. Such linear stepper motor comprises a dome, wherein said screen is fused to the inside of said dome, a circular platen attached to said screen, perpendicular to said axis and aligned so said axis and said platen's center of curvature intersect, and a plurality of stationary forcers spaced around said platen under control of provided signals for rotating said dome.

Figure 6:
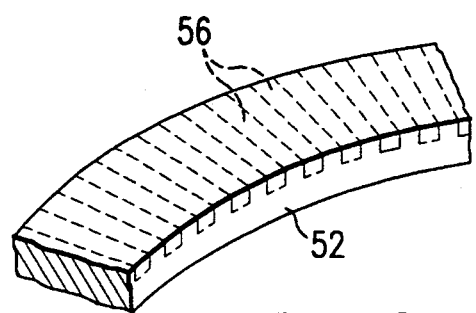
FIG. 6 shows the bottom side of the curved platen.

FIG. 6 is an upward view of the bottom of platen 52 showing the radiance of the magnetic elements 56 embedded therein.

Figure 7:
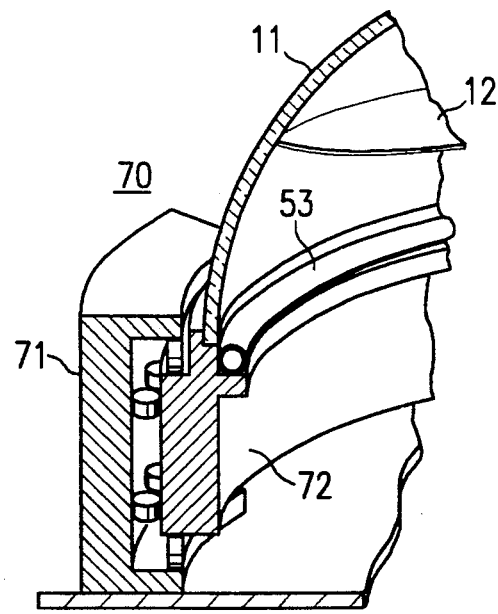
FIG. 7 shows a side mounted curved linear motor.

FIG. 7 shows linear drive stepper motor 70 in a vertical orientation with forcer 71 being stationary on the outside with platen 72 inside and connected to dome 11 Forcer 71 and platen 72 have the same radius of curvature from the center line of dome 11.

Figure 8:
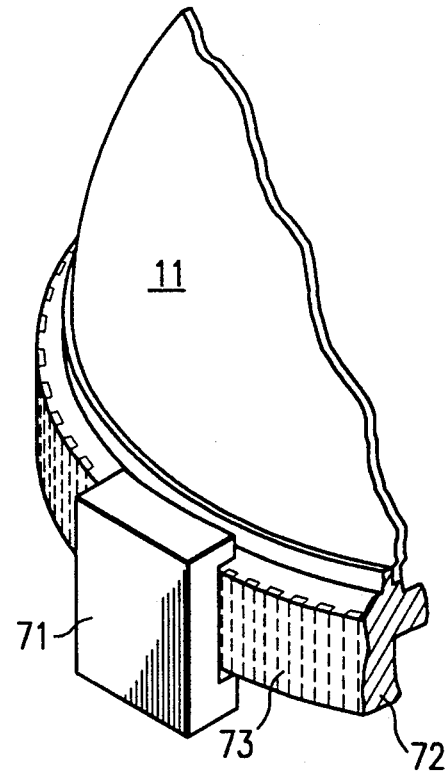
FIG. 8 shows the radius of curvature of the linear stepper motor.

FIG. 8 is a side view of forcer 71 and platen 72 as they would appear attached to a table top (not shown) and driving the bottom of dome 11. The embedded magnetic elements 73 are shown ringing platen 72.

Although this description describes the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A linear stepper motor comprising:
   (a) a stationary forcer having a radius of curvature and magnetic elements positioned therein, said forcer occupying a sector of a circle subscribed by said radius;
   (b) a platen having a circular perimeter, having substantially the same radius of curvature as said stationary forcer and having magnetic elements positioned therein operable in conjunction with said magnetic elements of said forcer for driving all points of said perimeter of said platen along said forcer following a circle; and
   (c) a support supporting said platen only along the region of said perimeter.

2. The motor set forth in claim 1 wherein said platen further comprises:
   a locking mechanism for attaching a rotatable structure to said platen so that said rotatable structure subscribes the same arc as said platen under control of said forcer.

3. The motor set forth in claim 2 further comprising:
   a position determining device for attachment to said platen for signalling the rotational position of said platen around said arc.

4. A system for rotation of a dome, said system comprising:
   (a) a dome having a circumferential edge for controlling said rotation;
   (b) a stationary member having included therein a plurality of controllable magnetic fields, said stationary member having a radius of curvature matching the radius of curvature of said circumferential edge;
   (c) a movable member having a circular perimeter, mated to said stationary member and responsive to said magnetic fields of said stationary member for moving all points of said perimeter along said curved radius of said stationary member under control of said magnetic fields;
   (d) a coupling member for connecting said circumferential edge of said dome to said movable member; and
   (e) a support supporting said movable member only along the region of said perimeter.

5. The system set forth in claim 4 further comprising a plurality of said movable members positionally spaced along said stationary member, each said movable member attached to a finite point of said circumferential edge of said dome.

6. The system set forth in claim 5 wherein said stationary member defines a complete circle and drives said controllable magnetic fields to control the rotational speed of said dome around said circle.

7. The system set forth in claim 6 further comprising:
   a position determining member for signalling the rotational position of at least one of said movable members around said circle.

8. A method of rotating a dome having a circumferential edge for controlling said rotation, said method comprising the steps of:
   (a) positioning in a circle a stationary member having including therein a plurality of controllable magnetic fields, the radius of said circle matching the radius of curvature of said circumferential edge;

(b) moving all point of a movable member having a circular perimeter along said stationary member under control of said magnetic fields;

(c) connecting said circumferential edge of said dome to said movable member; and (d) supporting said movable member only along the region of said perimeter.

9. The method set forth in claim 8 further comprising the step of:

positionally spacing a plurality of said movable members along said stationary member, each said movable member attached to a finite point of said circumferential edge of said dome.

10. The method set forth in claim 9 further comprising the step of:

signalling the rotational position of at least one of said movable members around said circle.

11. A linear stepper motor comprising:

(a) a stationary forcer with a radius of curvature; and (b) a movable platen having a circular perimeter under control of provided signals with a matching radius of curvature, said platen moving in response to said provided signals and said stationary forcer occupying a sector of a circle represented by said radius of curvature; and (c) a support supporting said movable platen only along the region of said perimeter.

12. The device of claim 11 wherein said platen is a complete circle.

13. The device of claim 11 further comprising a plurality of forcers.

14. A linear stepper motor for the rotation of a screen about an axis comprising:

(a) a dome having a screen fused to the inside of said dome;

(b) a platen having a circular perimeter attached to said dome, perpendicular to said axis and aligned so said axis and the center of curvature of said platen intersect;

(c) a plurality of sectoral stationary forcers spaced around said platen under control of provided signals for rotating said dome; and (d) a support supporting said movable platen only along the region of said perimeter.

15. The device of claim 14 further comprising magnetic elements aligned horizontally in a common plane within said circular platen.

16. The device of claim 14 further comprising magnetic elements aligned parallel to and vertically along the outside surface of said circular platen.

17. The device of claim 14 further comprising a system to determine the position of said platen with respect to said forcers.

* * * * *